United States Patent

Doherty et al.

[11] Patent Number: 6,115,083
[45] Date of Patent: Sep. 5, 2000

[54] LOAD/RESET SEQUENCE CONTROLLER FOR SPATIAL LIGHT MODULATOR

[75] Inventors: Donald B. Doherty, Richardson; Gregory J. Hewlett, Garland, both of Tex.

[73] Assignee: Texas Instruments Incorporated, Dallas, Tex.

[21] Appl. No.: 08/964,516

[22] Filed: Nov. 5, 1997

[51] Int. Cl.[7] .................................................. H04N 5/74
[52] U.S. Cl. .......................................... 348/771; 344/85
[58] Field of Search ..................... 348/771, 756, 348/770, 718, 719, 755; 345/85, 84, 151, 148; H04N 5/74

[56] References Cited

U.S. PATENT DOCUMENTS

| | | | |
|---|---|---|---|
| 5,008,833 | 4/1991 | Agranat et al. | 364/513 |
| 5,231,388 | 7/1993 | Stoltz | 345/84 |
| 5,285,407 | 2/1994 | Gale et al. | 365/189.11 |
| 5,307,056 | 4/1994 | Urbanus | 345/509 |
| 5,497,172 | 3/1996 | Doherty et al. | 345/85 |

FOREIGN PATENT DOCUMENTS

| | | |
|---|---|---|
| 0 530 762 A2 | 3/1993 | European Pat. Off. . |
| 0 698 874 A1 | 2/1996 | European Pat. Off. . |

*Primary Examiner*—Michael H. Lee
*Attorney, Agent, or Firm*—Charles A. Brill; Frederick J. Telecky, Jr.; Richard L. Donaldson

[57] ABSTRACT

A sequence controller (18) for controlling load/reset sequences for a spatial light modulator (15). The sequence controller has a program memory (41) for storing load instructions and reset instructions. A load control processor (42) executes load instructions. A reset control processor (43) executes reset instructions. The two processors (42, 43) operate independently except for synchronization.

15 Claims, 5 Drawing Sheets

LOAD/RESET SEQUENCE CONTROLLER FOR SPATIAL LIGHT MODULATOR

TECHNICAL FIELD OF THE INVENTION

This invention relates to digital image display systems using spatial light modulators (SLMs), and more particularly to controlling the sequence of control signals for loading display elements of an SLM with data and resetting them between loads.

BACKGROUND OF THE INVENTION

Video display systems based on spatial light modulators (SLMs) are increasingly being used as an alternative to display systems using cathode ray tubes (CRTs). SLM systems provide high resolution displays without the bulk and power consumption of CRT systems.

Digital micro-mirror devices (DMDs) are a type of SLM, and may be used for either direct-view or projection display applications. A DMD has an array of micro-mechanical display elements, each having a tiny mirror that is individually addressable by an electronic signal. Depending on the state of its addressing signal, each mirror tilts so that it either does or does not reflect light to the image plane. The mirrors may be generally referred to as "display elements", which correspond to the pixels of the image that they generate. Generally, displaying pixel data is accomplished by loading memory cells connected to the display elements. Once its memory cell is loaded, a display element is reset so that it tilts in accordance with the on or off state of the data in the memory cell. The display elements can maintain their on or off state for controlled display times.

Other SLMs operate on similar principles, with an array of display elements that may emit or reflect light simultaneously, such that a complete image is generated by addressing display elements rather than by scanning a screen. Another example of an SLM is a liquid crystal display (LCD) having individually driven display elements.

To achieve intermediate levels of illumination, between white (on) and black (off), pulse-width modulation (PWM) techniques are used. The basic PWM scheme involves first determining the rate at which images are to be presented to the viewer. This establishes a frame rate and a corresponding frame period. For example, in a standard television system, images are transmitted at 30 frames per second, and each frame lasts for approximately 33.3 milliseconds. Then, the intensity resolution for each pixel is established. In a simple example, and assuming n bits of resolution, the frame time is divided into $2^n-1$ equal time slices. For a 33.3 millisecond frame period and n-bit intensity values, the time slice is $33.3/(2^n-1)$ milliseconds.

Having established these times, for each pixel of each frame, pixel intensities are quantized, such that black is 0 time slices, the intensity level represented by the LSB is 1 time slice, and maximum brightness is $2^n-1$ time slices. Each pixel's quantized intensity determines its on-time during a frame period. Thus, during a frame period, each pixel with a quantized value of more than 0 is on for the number of time slices that correspond to its intensity. The viewer's eye integrates the pixel brightness so that the image appears the same as if it were generated with analog levels of light.

For addressing SLMs, PWM calls for the data to be formatted into "bit-planes," each bit-plane corresponding to a bit weight of the intensity value. Thus, if each pixel's intensity is represented by an n-bit value, each frame of data has n bit-planes. Each bit-plane has a 0 or 1 value for each display element. In the simple PWM example described in the preceding paragraphs, during a frame, each bit-plane is separately loaded and the display elements are addressed according to their associated bit-plane values. For example, the bit-plane representing the LSBs of each pixel is displayed for 1 time slice, whereas the bit-plane representing the MSBs is displayed for 2n/2 time slices. Because a time slice is only $33.3/(2^n-1)$ milliseconds, the SLM must be capable of loading the LSB bit-plane within that time. The time for loading the LSB bit-plane is the "peak data rate."

U.S. Pat. No. 5,278,652, entitled "DMD Architecture and Timing for Use in a Pulse-Width Modulated Display System," assigned to Texas Instruments Incorporated describes pulse width modulation for addressing a DMD in a DMD-based display system. It is directed to "global reset" methods, where the entire array of display elements is reset at the same time, after each is addressed with the appropriate data.

In "split reset" addressing methods, the SLM is specially configured, with its display elements are grouped into groups that are separately loaded and reset. This reduces the amount of data to be loaded during any one time. Each memory cell is shared by a display element from each group. This reduces memory hardware requirements. However, because of the shared memory cells, bit-planes must be distributed differently for each group so that loads and resets of the sharing display elements do not conflict. The split reset configuration is described in U.S. patent application Ser. No. 08/300,356, entitled "Pixel Control Circuitry for Spatial Light Modulator", assigned to Texas Instruments Incorporated.

A third type of SLM addressing is "divided reset" addressing. The display elements are divided into groups, but each display element has its own memory cell. After the memory cells of one group are loaded with their data from a bit-plane, memory cells of a next group are loaded with data from that bit-plane. This continues until all groups have been loaded with data for the same bit-plane. This phased loading is followed by a phased reset, so that all groups consecutively begin their display of the bit-plane. This method is described in U.S. patent application Ser. No. 08/721,862, entitled "Divided Reset for Addressing Spatial Light Modulator", assigned to Texas Instruments Incorporated.

SUMMARY OF THE INVENTION

One aspect of the invention is a load/reset sequence controller for a spatial light modulator whose display elements are loaded with data and reset between loads. A program memory stores at least one set of instructions for a load sequence and at least one set of instructions for a reset sequence. Each instruction identifies a time when the display elements are to be loaded or reset. A load control processors executes the instructions for the load sequence. A reset processor executes the instructions for the reset sequence. The two processors are independent except for being externally synchronized to common reference times. A program manager controls the delivery of instructions to the processors.

An advantage of the invention is that it permits the timing between loads and resets to be programmed and to vary for different bit-planes. This is especially useful for spatial light modulators having a divided reset configuration where loads and resets are phased.

DETAILED DESCRIPTION OF THE INVENTION

Overview of SLM Display Systems Using PWM

One aspect of the invention described herein is a load/reset sequence controller for a display system having a spatial light modulator (SLM) that loads data to display elements and resets the display elements between loads. Load control signals initiate loading of data and reset control signals cause them to take the on or off state represented by the data. In the case of a digital micro-mirror device, the load and reset signals cause the mirror elements to have either an on or an off tilt position. However, the invention could be used for any type of SLM that uses load and reset signals. The controller has a partitioned design, with two pseudo independent processors. One processor controls reset signals and the other processor controls load signals. The controller is especially useful for display systems having a divided reset configuration, for the reason that the timing relationship between loading and resetting is not constant.

Comprehensive descriptions of SLM-based digital display systems are set out in U.S. Pat. No. 5,079,544, entitled "Standard Independent Digitized Video System," and in U.S. patent Ser. No. 08/147,249, entitled "Digital Television System," and in U.S. patent Ser. No. 08/146,385, entitled "DMD Display System." These systems are specifically designed for a DMD (digital micro-mirror device), which is a type of SLM. Each of these patents and patent applications is assigned to Texas Instruments Incorporated, and each is incorporated by reference herein. An overview of such systems is discussed below in connection with FIG. 1.

Figure 1:
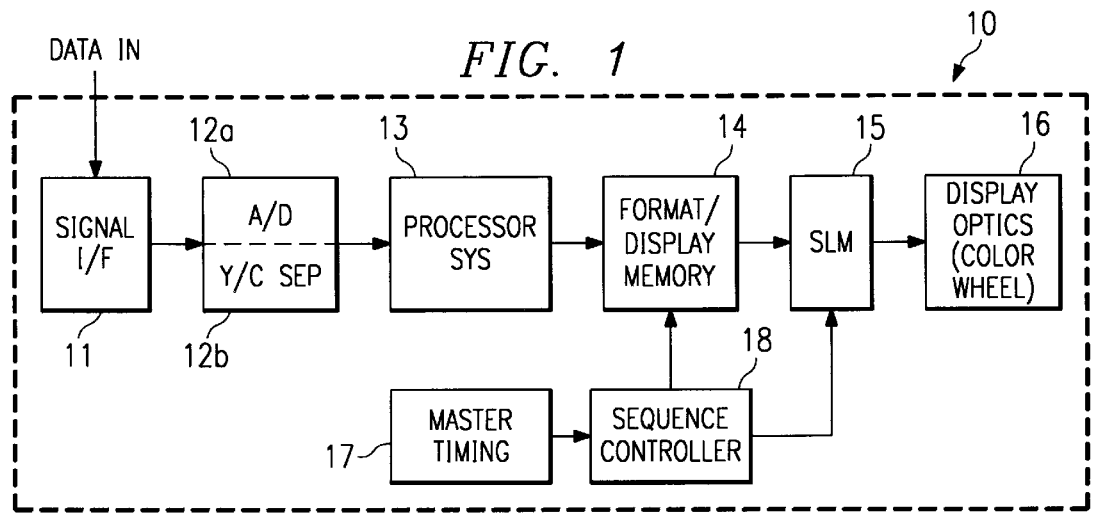
FIG. 1 is a block diagram of a display system that has a sequence controller in accordance with the invention.

FIG. 1 is a block diagram of a projection display system 10, which uses an SLM 15 to generate real-time images from an input signal, such as a broadcast television signal. In the example of this description, the input signal is analog, but in other embodiments, the input signal could be digital, eliminating the need for A/D converter 12a.

Only those components significant to main-screen pixel data processing are shown. Other components, such as might be used for processing synchronization and audio signals or secondary screen features, such as closed captioning, are not shown.

Signal interface unit 11 receives an analog video signal and separates video, synchronization, and audio signals. It delivers the video signal to A/D converter 12a and Y/C separator 12b, which convert the data into pixel-data samples and which separate the luminance ("Y") data from the chrominance ("C") data, respectively. In FIG. 1, the signal is converted to digital data before Y/C separation, but in other embodiments, Y/C separation could be performed before A/D conversion.

Processor system 13 prepares the data for display, by performing various pixel data processing tasks. Processor system 13 may include whatever processing memory is useful for such tasks, such as field and line buffers. The tasks performed by processor system 13 may include linearization (to compensate for gamma correction), colorspace conversion, and interlace to progressive scan conversion. The order in which these tasks are performed may vary.

Display memory 14 receives processed pixel data from processor system 13. It formats the data, on input or on output, into "bit-plane" format, and delivers the bit-planes to SLM 15. As discussed in the Background, the bit-plane format permits each display element of SLM 15 to be turned on or off in response to the value of one bit of data.

Display memory 14 is capable of providing bit-plane data to be displayed on whatever rows of the SLM 15 are associated with a designated group. In accordance with divided reset addressing, it provides the data for the series of groups that comprises a bit-plane, then the data for groups of a next bit-plane, etc.

In a typical display system 10, display memory 14 is a "double buffer" memory, which means that it has a capacity for at least two display frames. The buffer for one display frame can be read out to SLM 15 while the buffer another display frame is being written. The two buffers are controlled in a "ping-pong" manner so that data is continuously available to SLM 15.

The bit-plane data from display memory 14 is delivered to SLM 15. Although this description is in terms of a DMD-type of SLM 15, other types of SLMs could be substituted into display system 10. As stated above, the invention assumes an SLM whose display elements are loaded with data and reset between loads. Details of a suitable SLM 15 are set out in U.S. Pat. No. 4,956,619, entitled "Spatial Light Modulator," which is assigned to Texas Instruments Incorporated and incorporated by reference herein.

Essentially, SLM 15 uses the data from display memory 14 to address each display element of its display element array. The "on" or "off" state of each display element forms an image. In the embodiment of this invention, each display element of SLM 15 has an associated memory cell and is configured for "divided reset".

Display optics unit 16 has optical components for receiving the image from SLM 15 and for illuminating an image plane such as a display screen. For color displays, display optics unit 16 includes a color wheel, to which a sequence of bit-planes for each color are synchronized. In an alternative embodiment, the data for different colors could be concurrently displayed on multiple SLMs and combined by the display optics unit.

Master timing unit 17 provides various system control functions.

Sequence controller 18 provides reset control signals to SLM 15 and load control signals to frame memory 14. Its structure and operation are explained below in connection with FIGS. 4–8.

Divided Reset Addressing

Figure 2:
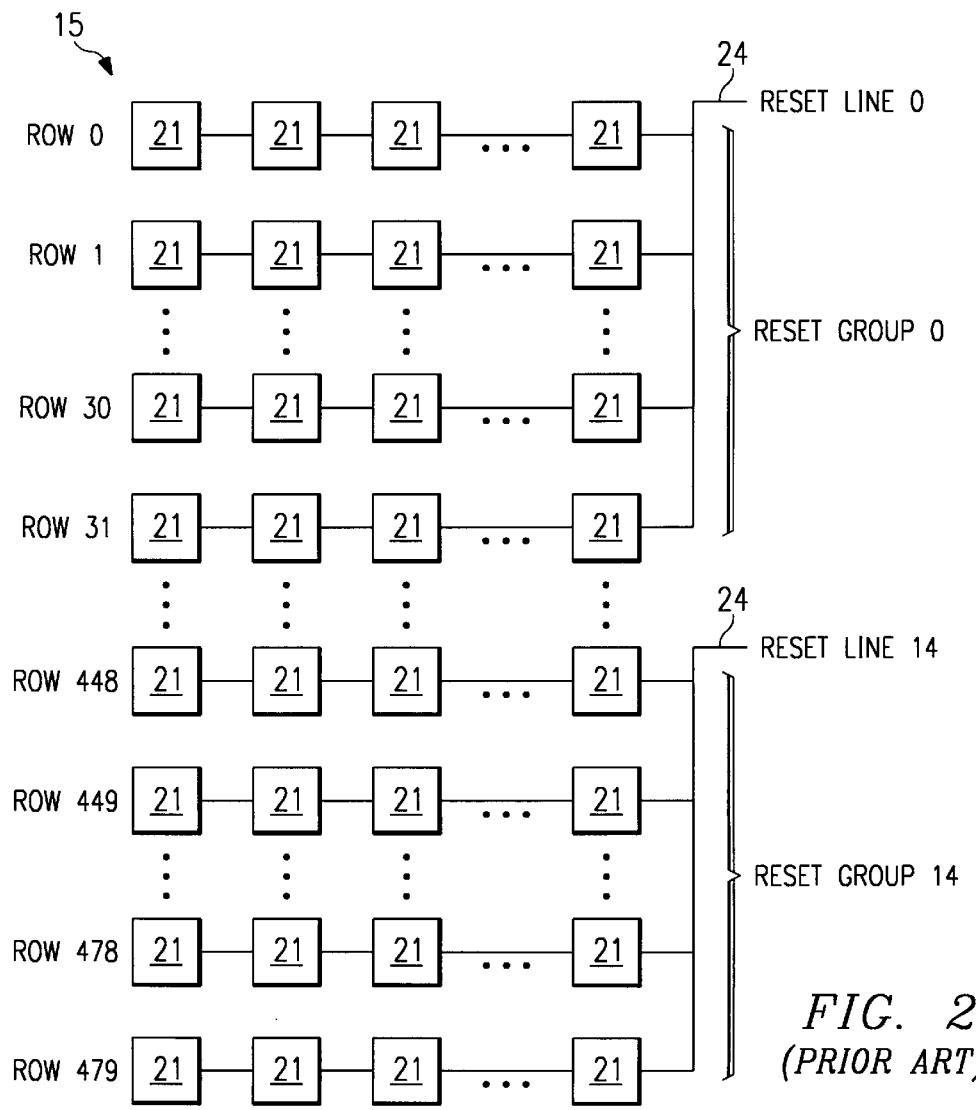
FIG. 2 illustrates a portion of the display element array of the SLM of FIG. 1, configured for divided reset addressing.

FIG. 2 illustrates a portion of the display element array of SLM 15, configured for divided reset addressing. As explained below, addressing the display elements 21 requires that each display element's memory cell be loaded with data and that it be reset between loads. Then, the display elements display the data by being on or off for a designated display time.

Only a small number of display elements 31 are explicitly shown, but as indicated, SLM 15 has additional rows and columns of display elements 21. A typical SLM has hundreds or thousands of such display elements 21. As stated above, each display element 21 has a memory cell, so that there are as many memory cells as display elements 21.

SLM 15 is divided into "groups" of display elements 21, which are defined by which display elements 21 are connected to a single reset line 24. In the example of FIG. 2, each 32 consecutive rows of display elements 21 are connected to a single reset line 24, and thus these 32 rows of display elements are a "group". If a 480 row SLM has 32 rows per group, there are 15 groups.

The number of groups into which SLM 15 is arranged is somewhat arbitrary. In general, the minimum bit-plane display time is inversely proportional to the number of groups. On one hand, shorter bit times are desirable because they allow more light output and better flexibility for mitigating visual artifacts. On the other hand, overall complexity of the display system 10 increases with more groups because of the need for additional drive circuits, package pins, and control circuitry. In general, however, the principles described herein apply to a SLM 15 having any number of groups more than one.

The rows of each group need not be consecutive. Any pattern is possible, such as an interleaved pattern of every nth row for n reset lines. The pattern could be in vertical or diagonal rows. Furthermore, the pattern need not be row by row, and could be in blocks, contiguous or interleaved. However, experimentation indicates that visual artifacts are minimized for consecutive horizontal rows.

The bit-plane data for the groups is formatted into group data. Thus, where p is the number of active display elements of the SLM 15 and q is the number of groups, a bit-plane having p number of bits is formatted into q groups of data, each group having p/q bits of data.

Figure 3:
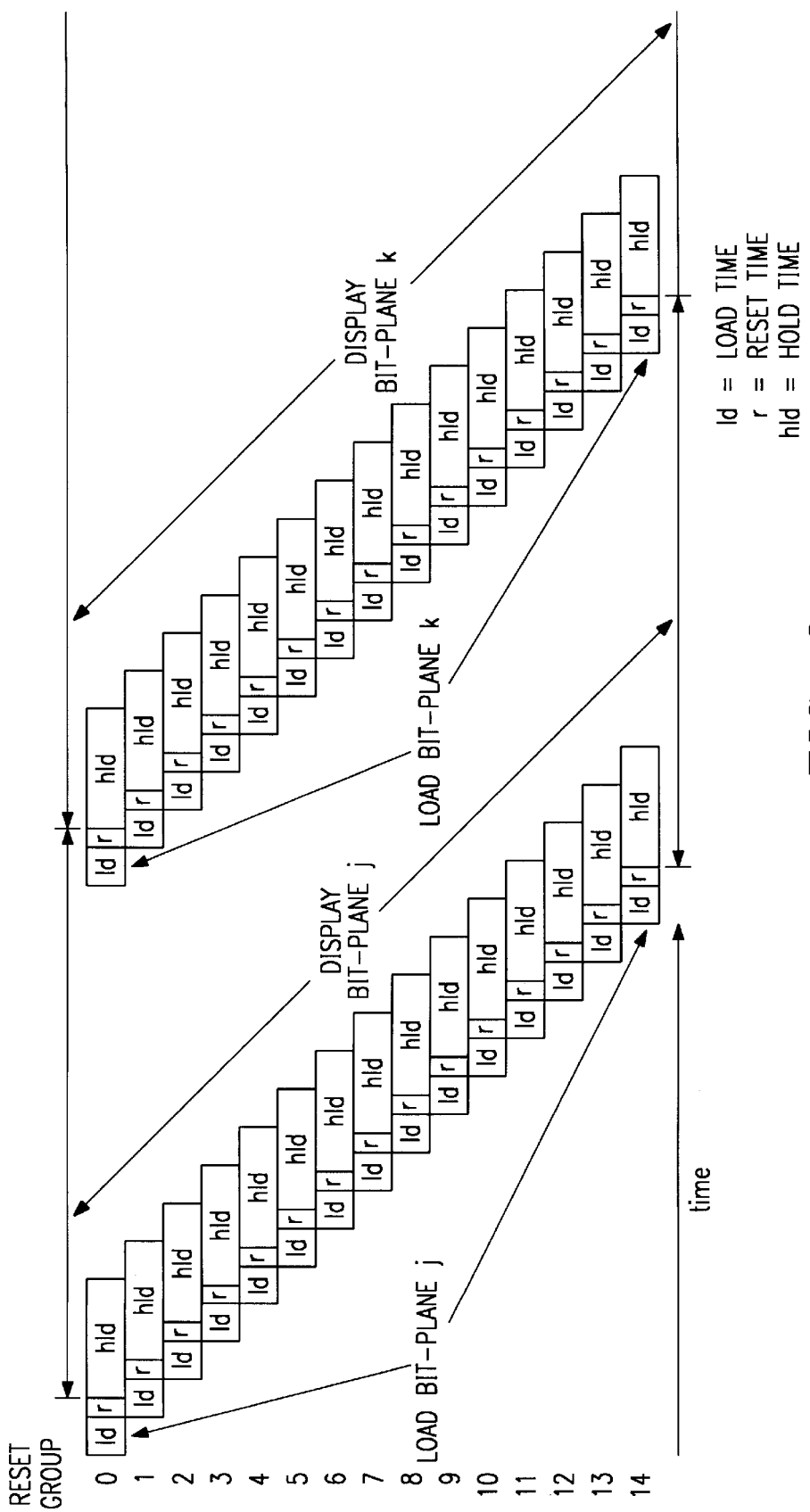
FIG. 3 illustrates the phased loads and resets of a divided reset system.

FIG. 3 illustrates how the 15 groups of FIG. 2 are loaded and reset for display of a bit-plane j. Each group is first loaded with data, during a load time, ld. Then, the display elements of this group are reset. The reset time, r, represents the time when a reset signal is applied on the reset line connected to that group. The reset signal causes each mirror in the group to change state in accordance with the data stored in its memory cell. After being reset, the group begins its display time. At the beginning of the display time, the display elements undergo a "hold" time, hld, during which the data must be stable.

As soon as one group is loaded, the loading for the next group may begin. This loading, resetting, and displaying process is repeated for each of the 15 groups, such that after each group is loaded, the loading of the next group begins while the previous group is being reset and displayed.

In FIG. 3, each group is reset immediately after it is loaded, resulting in a "phased reset". As a result, the display times of the groups for the bit-plane are skewed at the beginning and end of the display time. However, the viewer perceives the display elements, "on" time nearly the same as if all display elements were on simultaneously for the bit time.

In FIG. 3, the reset of each group occurs immediately after loading of that group. As a result, the display time is as long as the total time to load all groups. This is a "nominal display time". In the particular example of FIG. 3, the display time for bit-plane j, is the same as the time to load all groups— from the reset of Group 0 to the reset of Group 14. The display time can be made longer by delaying the loading for the next bit-plane. For shorter display times, the resets can be delayed with respect to the loads. Also, the time between load and reset need not be the same among groups, which makes it possible to align the resets rather than skew them at the beginning of a bit-plane display time. These variations of the phased load and reset are discussed in U.S. patent application Ser. No. 08/721,862 referenced above and incorporated by reference herein.

Sequence Controller

Figure 4:
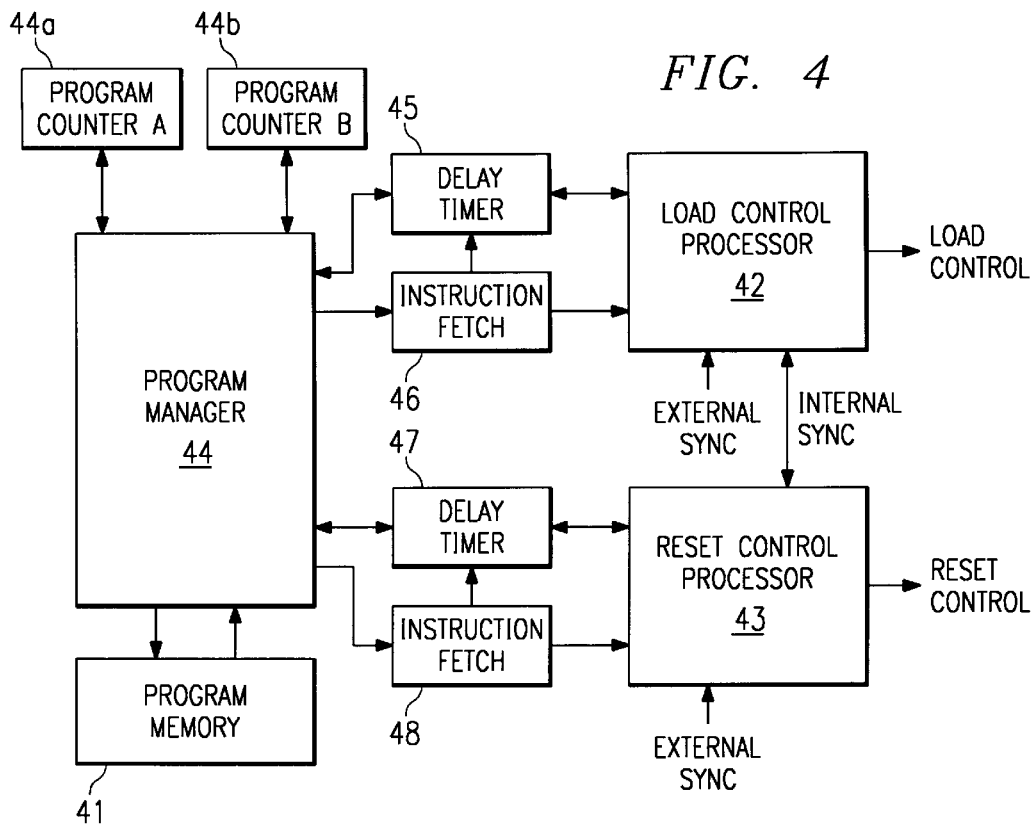
FIG. 4 is a block diagram of a sequence controller in accordance with the invention.

FIG. 4 is a block diagram of a sequence controller 40 in accordance with the invention. It is programmed with a sequence of load and reset control instructions, which are stored in a program memory 41. The "sequence" is the particular order, for a frame period, of loads and resets for all groups. For example, relative to time 0, a portion of a reset sequence might have the following three instructions:
reset [170,1]
reset [16,2]
reset [16,3],
where the argument is [delay, group number]. A portion of a load sequence might have the following two instructions:
load [300,5]
load [198,6],
where the argument is [delay, bit-plane number]. Usually, a load of a bit-plane occurs without interruption for all groups. When this is the case, no group designations are necessary, it being implied that a load instruction is for a continuous series of all groups. However, as explained below, there may be situations when the loads of groups for a bit-plane are interleaved in time with resets for a subsequent bit-plane.

Also, it should be understood that a bit-plane may be displayed contiguously for its entire display time or may be "segmented". In the latter case, the display time is divided into segments and the segments distributed within the frame time. A segmented bit-plane's data is re-loaded each time one of its segments is to be displayed.

The reset sequence and the load sequence are coordinated with each other so that loads and resets occur at the proper times. In the above examples of reset and load sequences, the delays are from a common reference.

The sequence programmed into sequence controller 18 may be the result of a sequence generation process that is described in U.S. patent application Ser. No. 08/975,377 (Atty Dkt No. TI-22663), entitled "Generating Load/Reset Sequences for Spatial Light Modulator", assigned to Texas Instruments Incorporated and incorporated by reference herein.

Sequence controller 40 has two processors 42 and 43, which generate control signals for resets and for data loads, respectively. Load control signals are handled by load control processor 42. It delivers load control signals to a memory controller that is part of frame memory 14. Reset signal timing is handled by reset control processor 43. It delivers reset control signals to a reset controller that is part of SLM 15. The two processors 42 and 43 operate independently except for synchronization.

Each processor 42/43 has two registers, a delay timer 45/47 and a next instruction fetch register 46/48. Each processor 42/43 accesses only its own registers.

Figure 5:
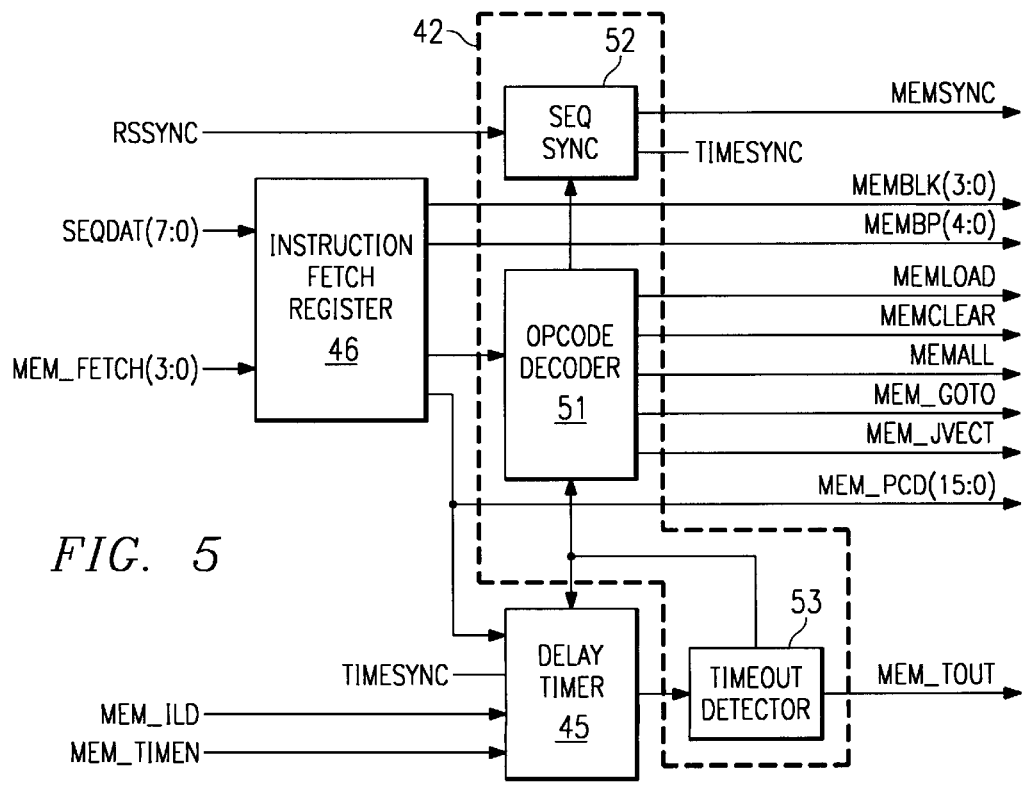
FIG. 5 is a block diagram of a suitable load control processor for the sequence controller of FIG. 4.
Figure 6:
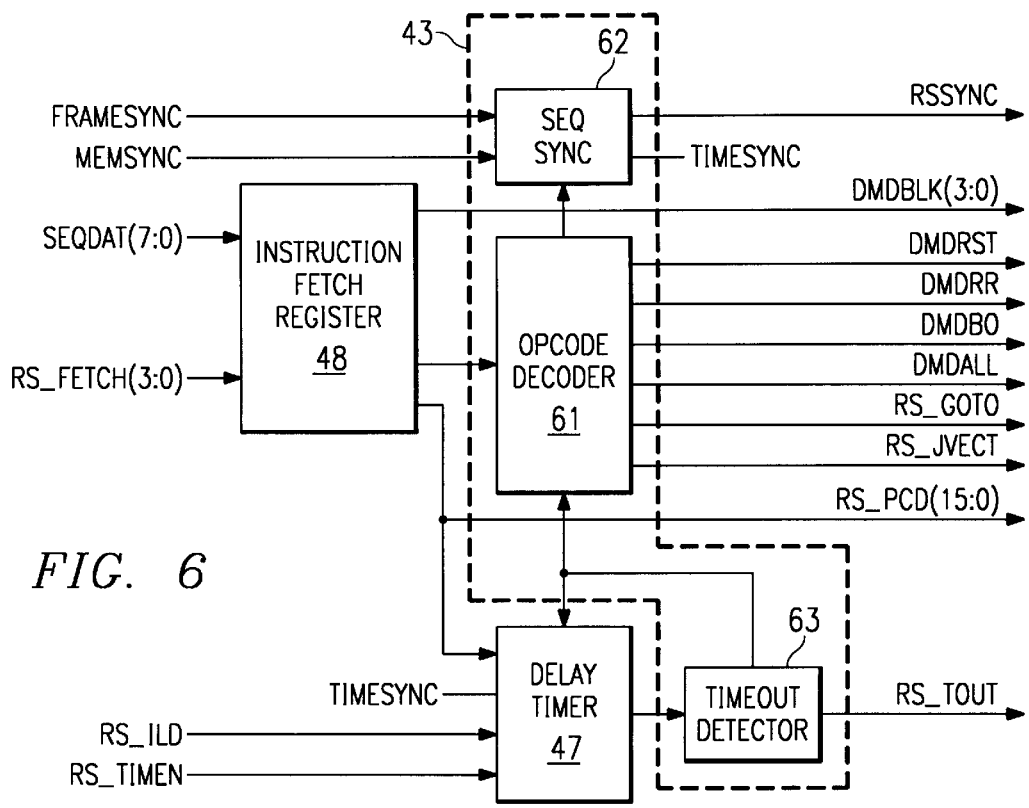
FIG. 6 is a block diagram of suitable reset control processor for the sequence controller of FIG. 4.

FIGS. 5 and 6 are block diagrams of implementations of a load control processor 42 and of a reset control processor 43, respectively. As illustrated, both processors 42/43 are comprised of an opcode decoder 51/61, a sequence synchronizer 52/62, and a timeout detector 53/63.

Load control processor 42 and reset control processor 43 each have their own set of machine instructions, which they independently execute. Several common operations, such as goto, wait, and wait-for-sync, have identical opcodes. Appendices A and B set out memory and reset instructions, respectively.

A program manager 44 controls program flow. It maintains two program counters 44a and 44b, which point to the next instruction to be fetched for each processor 42 or 43.

Figure 7:
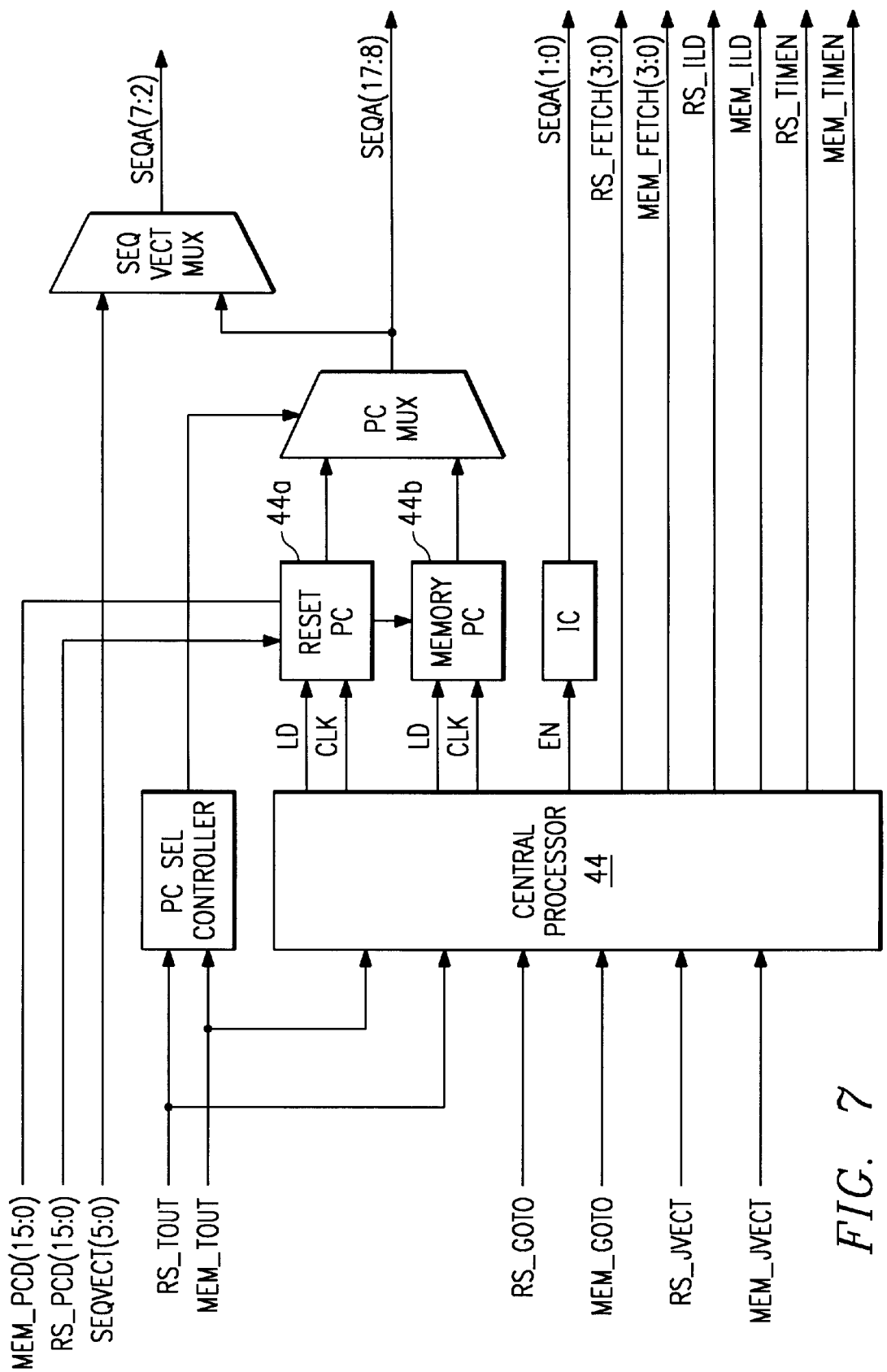
FIG. 7 is a block diagram of one implementation of the program manager for the sequence controller of FIG. 4.

FIG. 7 is a block diagram of one implementation of program manager 44 and its related electronics.

The instruction timing is set up for zero-wait-state execution. Instructions for both processors 42 and 43 are pre-fetched so that at least one instruction is available and ready to be executed when the current instruction is completed. In practice, reset instruction fetches have priority over load instruction fetches because reset operations control the actual light output. Program manager 44 recognizes goto instructions as they are fetched so that the argument address is immediately loaded into a program counter and another instruction fetch commences.

Each processor 42/43 uses the same bitmap for its instructions. The instructions are 32 bits (four bytes with eight bits per byte). The bitmap is as follows:

|        |          | 7 | 6 | 5 | 4 | 3 | 2 | 1 | 0 |
|--------|----------|---|---|---|---|---|---|---|---|
| byte 1 | opcode   |   |   |   | group |   |   |   |   |
| byte 2 | reserved |   |   |   | bit-plane |   |   |   |   |
| byte 3 |          |   |   |   | delay or address msb's |   |   |   |   |
| byte 4 |          |   |   |   | delay or address lsb's |   |   |   |   |

As indicated, each instruction identifies a bit-plane and group to be loaded (in the case of a load control instruction) or reset (in the case of a reset instruction). Two bytes are used for a delay or address. Delays represent a number of clock counts until the next instruction. Addresses are used for goto instructions.

Each instruction, except for branching and synchronization instructions, is a timed instruction. The period of an instruction is timed by delay timers 45/47. A delay count for an instruction is loaded into a delay timer 45/47 on the first clock of the instruction. The delay timer 45/47 is decremented on each clock until it reaches zero. At this time, the next instruction begins. The processor 42/43 begins executing an instruction on the same clock that its delay timer 45/47 is loaded. Also, on the same clock, program manager 41 initiates the next instruction pre-fetch.

A load instruction can include a bit-plane identifier without a reset-group identifier. Such an instruction will cause all reset-groups for the bit-plane to be consecutively loaded. Alternatively, a load instruction with a group identifier can be used to load one block at a time. This "block loading" might be called for when a bit-plane's reset and load skew are adjusted, such as might occur to avoid a reset conflict. Such a situation is discussed in U.S. patent application Ser. No. 08/975,377 (Atty Dkt No. 22663), incorporated by reference above.

Figure 8:
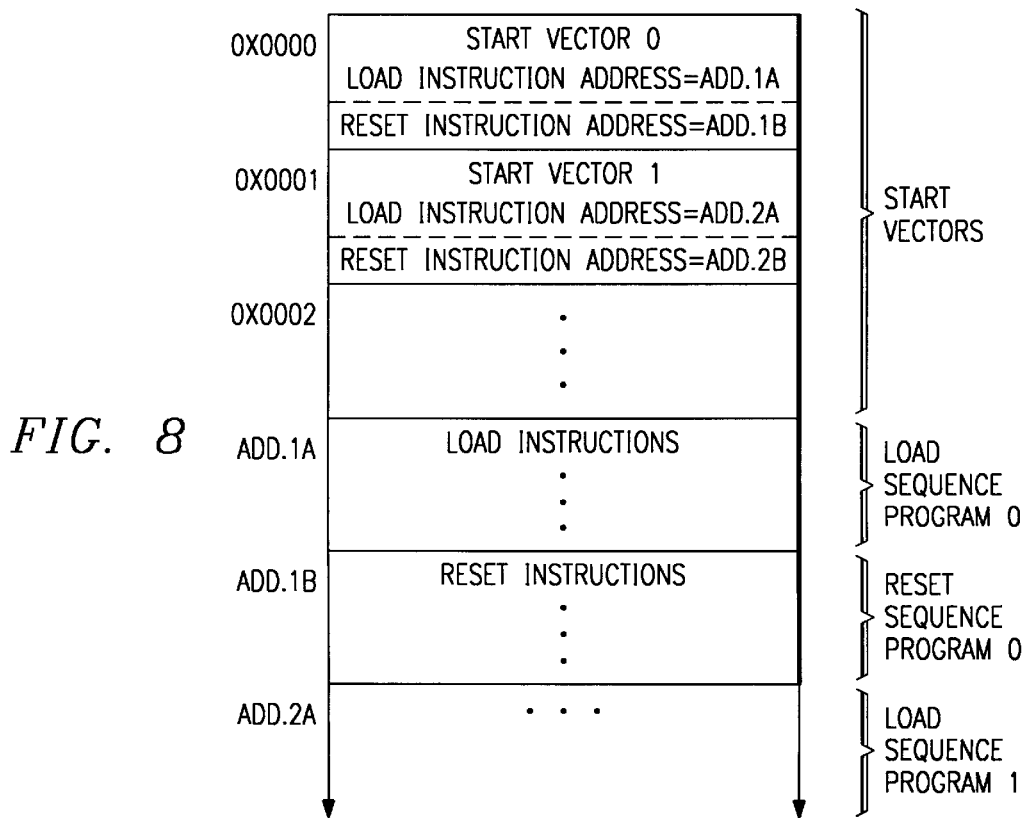
FIG. 8 illustrates the organization of the program memory of FIG. 4.

FIG. 8 illustrates the organization of program memory 41. Typically, program memory 41 is a programmable read-only memory (PROM).

A section of memory beginning at address 0x0000 contains a list of start vectors. Like instructions, start vectors each occupy four bytes. Addresses in start vectors and goto instructions point to four-byte words, with a resulting address space of 262,144 bytes. Each start vector contains the addresses of the first instructions of a load sequence program and of a corresponding reset sequence program. A start vector can be activated by either a hardware reset or a Jump-to-Vector instruction.

At start-up, program manager 44 reads addresses from a designated start vector and stores them in their respective program counters 44a and 44b. The program manager 44 then pre-fetches instructions for the processors 42/43 so that they can be started in unison. Program space above the start vector list contains code for one or more load sequence and reset sequence programs.

Load control processor 42 and reset control processor 43 can be synchronized in at least two ways. First, after a start vector fetch, the processors 42 and 43 are held until both have instructions pending and are then started on the same clock. Second, for synchronization instructions, such as Jump-to-Vector, Wait-for-Frame-Sync, and Wait-for-Proc-Sync, each processor's counter is allowed to count to zero from the previous instruction and both processors must have the same pending sync instruction before execution continues. In other words, if one processor times out with a pending sync instruction, the other can continue executing its program until it encounters the same sync instruction.

OTHER EMBODIMENTS

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A load/reset sequence controller for a spatial light modulator whose display elements are loaded with data and reset between loads, comprising:

a program memory for storing at least one set of instructions for a load sequence and at least one set of instructions for a reset sequence, each instruction identifying a time when said display elements are to be loaded or reset;

a load control processor for executing said instructions for a load sequence;

a reset processor for executing said instructions for a reset sequence; and a program manager for controlling the delivery of said instructions to said processors.

2. The sequence controller of claim 1, further comprising a first program counter for said set of instructions for a load sequence and a second program counter for said set of instructions for a reset sequence, said program counters accessed by said program manager.

3. The sequence controller of claim 1, further comprising a first delay timer in communication with said load control processor and a second delay timer in communication with said reset control processor.

4. The sequence controller of claim 1, further comprising a first instruction fetch register in communication with said load control processor and a second instruction fetch register in communication with said reset control processor.

5. The sequence controller of claim 1, wherein said program memory has stores one or more start vectors, each having an address to memory space for storing said instructions.

6. The sequence controller of claim 1, wherein said load control processor is comprised of an opcode decoder, a synchronizer, and a timeout detector.

7. The sequence controller of claim 1, wherein said reset control processor is comprised of an opcode decoder, a synchronizer, and a timeout detector.

8. A method of controlling load/reset sequences for a spatial light modulator whose display elements are loaded with data and reset between loads, comprising the steps of:

storing at least one set of instructions for a load sequence and at least one set of instructions for a reset sequence, each said sequence identifying a time when said display elements are to be loaded or reset;

executing said instructions for a load sequence with a load control processor;

executing said instructions for a reset sequence with a reset control processor;

wherein said load control processor and said reset control processor are separate devices.

9. The method of claim 8, further comprising the step of using a program manager to distribute said instructions to said load control processor and to said reset control processor.

10. The method of claim 8, wherein said executing steps are performed with a zero-wait-state by pre-fetching each next instruction.

11. The method of claim 8, wherein said instructions each include a delay count and wherein said executing steps are performed by decrementing said delay counts.

12. The method of claim 8, wherein said processors are synchronized in response to a start vector fetch.

13. The method of claim 8, wherein said processors are synchronized by delivering synchronization instructions to said processors, such that the second of said processors to receive one of said synchronization instructions may continue to execute until receiving its said synchronization instruction.

14. The method of claim 8, wherein said spatial light modulator have is a global reset spatial light modulator and wherein said instructions are for global loads and resets.

15. The method of claim 8, wherein said spatial light modulator have is a divided reset spatial light modulator and wherein said instructions are for phased loads and resets.

* * * * *

UNITED STATES PATENT AND TRADEMARK OFFICE
CERTIFICATE OF CORRECTION

PATENT NO.     : 6,115,083
DATED          : September 5, 2000
INVENTOR(S)    : Donald B. Doherty and Gregory J. Hewlett It is certified that error appears in the above-identified patent and that said Letters Patent is hereby corrected as shown below:

<u>Title page,</u>
Item [60], Related U.S. Application Data,
-- Provisional Application No. 60/029,752  Nov. 8, 1996. --

Signed and Sealed this

Thirty-first Day of December, 2002

JAMES E. ROGAN
*Director of the United States Patent and Trademark Office*